Jan. 3, 1956  R. W. WILSON  2,729,469
IMPLEMENT HITCH FOR TRACTORS
Original Filed Nov. 13, 1950  3 Sheets-Sheet 1
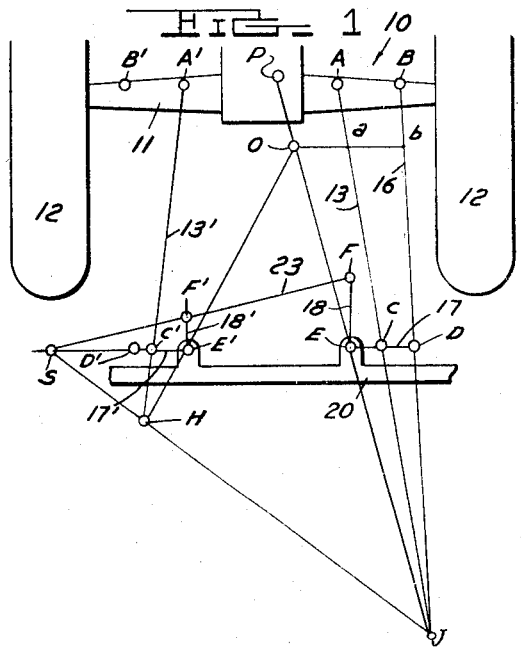
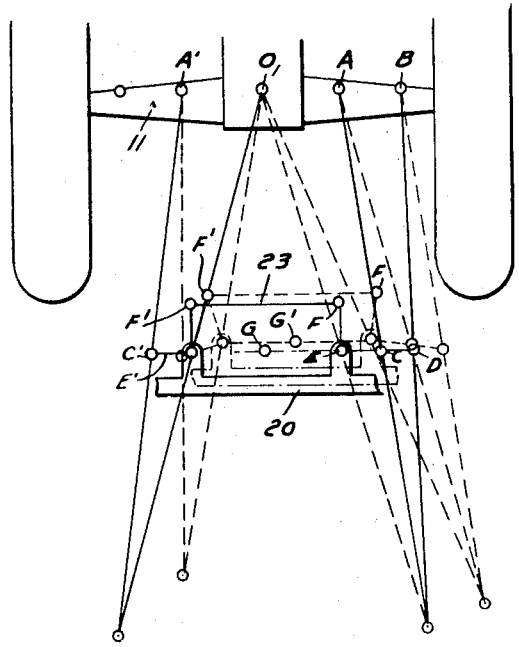
INVENTOR.
RAYMOND W. WILSON
BY Wilbur A. Schaich
ATTORNEY

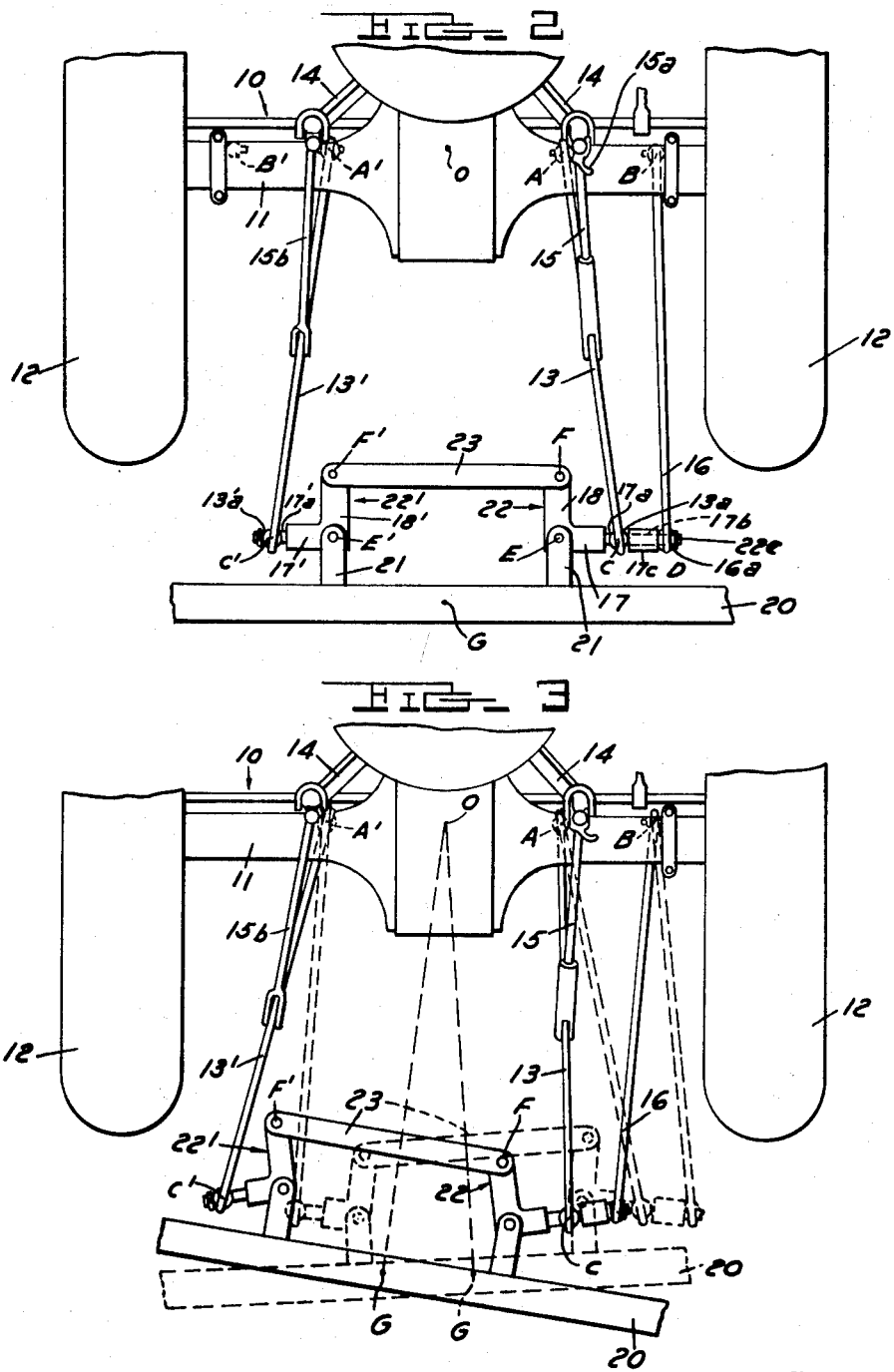

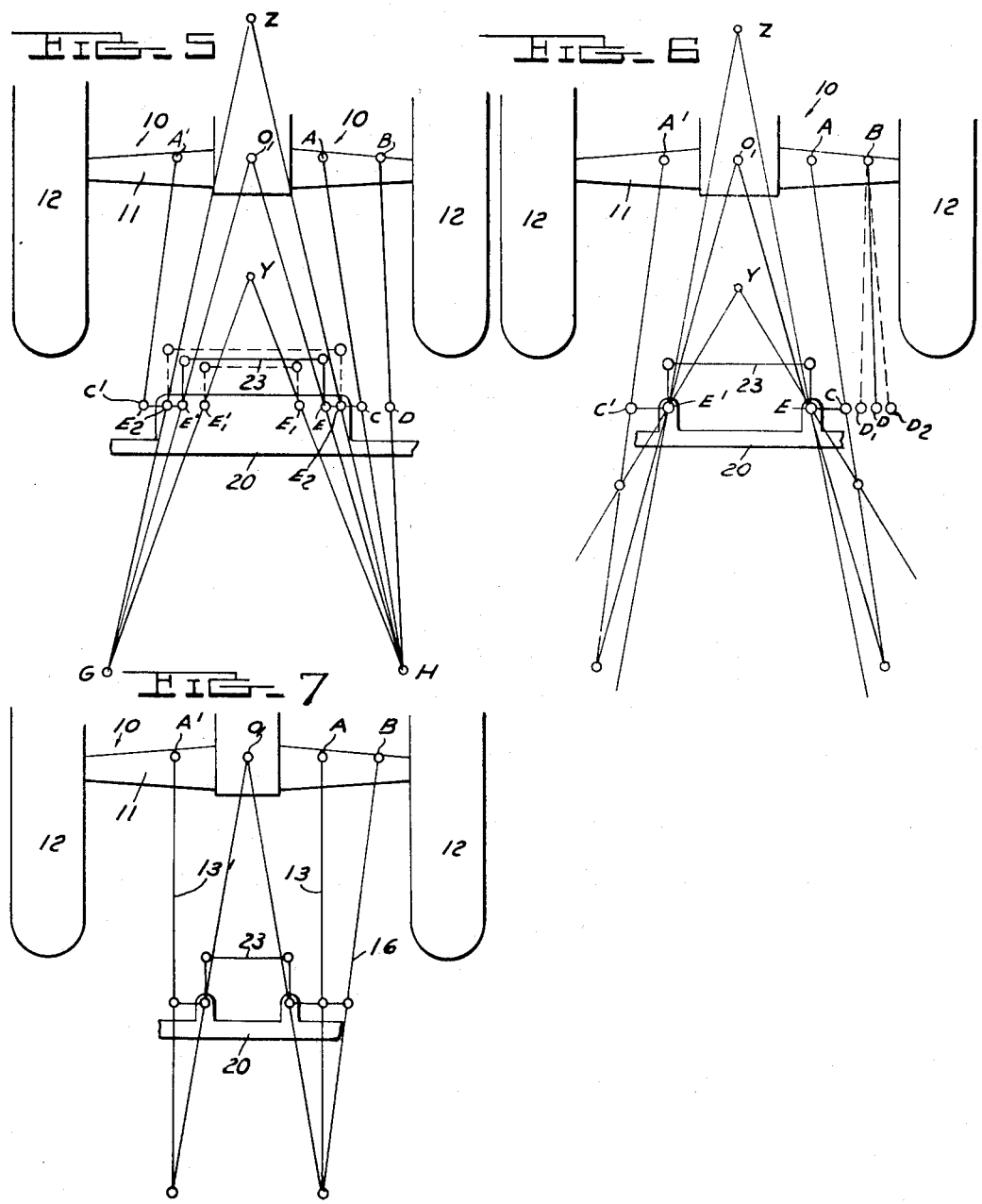

United States Patent Office 2,729,469
Patented Jan. 3, 1956

2,729,469

IMPLEMENT HITCH FOR TRACTORS

Raymond W. Wilson, Ferndale, Mich., assignor, by mesne assignments, to Ford Motor Company, Dearborn, Mich., a corporation of Delaware Original application November 13, 1950, Serial No. 195,158, now Patent No. 2,653,823, dated September 29, 1953. Divided and this application January 26, 1953, Serial No. 333,148

8 Claims. (Cl. 280—456)

This invention relates to an improved hitch for connecting farm implements to tractors, and particularly to a hitch construction for use with tractors having laterally spaced, universally pivoted, trailing hitch links which will permit any side draft forces involved in the operation of a drawn implement to be effectively applied to the tractor at any selected theoretical point.

This application is a division of my pending U. S. application, Serial No. 195,158, filed November 13, 1950, now United States Patent 2,653,823, issued September 29, 1953, entitled Implement Hitch for Tractors, and assigned to the assignee of the instant application.

In many farm implements, and particularly ground engaging types of implements such as moldboard and disc plows, a substantial lateral thrust is exerted upon the implement during its operation. Such lateral thrust is commonly referred to as side draft. When the implement is connected in conventional manner to tractors having laterally spaced, universally pivoted, trailing hitch links, any unbalanced side draft of the implement is transferred to the tractor, and the effective point of application of the lateral forces involved in such side draft is generally located at the theoretical intersection of the hitch links, which are generally slightly forwardly converging. Such theoretical intersection point is commonly located in the vicinity of the front axle of the tractor and, as a result, a substantial interference with the steering of the tractor is encountered whenever a side draft producing implement is pulled. Obviously, if the theoretical point of application of side draft forces could be located on the tractor at a point rearwardly of the front wheels, and preferably at a central point in the rear axle of the tractor, the adverse effects of the implement side draft upon the steering of the tractor would be substantially eliminated.

Accordingly, it is an object of this invention to provide an improved implement hitch for tractors of the type having laterally spaced, universally pivoted, trailing hitch links.

A further object of this invention is to provide an improved hitch construction for implements subject to side draft which will permit the point of application of the effective force on the tractor resulting from such side draft to be variably located on the tractor and, if desired, to be located at a point on the tractor producing a minimum interference with the steering and operation of the tractor.

A particular object of this invention is to provide an anti-side draft implement hitch for tractors having power-lifted hitch links which will not interfere in any manner with the lifting of the connected implement by the power lifted hitch links for transport or depth control purposes.

The specific nature of this invention, as well as other objects and advantages thereof, will become apparent to those skilled in the art from the following detailed description, taken in conjunction with the attached sheets of drawings on which, by way of preferred example only, are illustrated several embodiments of this invention.

On the drawings:

Fig. 1 is a schematic plan view of a hitch linkage embodying this invention and illustrating the geometric process utilized for determining the dimensions of the various elements of such hitch to produce an effective side draft reaction force at a selected point on the tractor.

Fig. 2 is a plan view of the rear portion of a tractor showing an implement hitch embodying this invention assembled thereto.

Fig. 3 is a view similar to Fig. 1 but illustrating the various positions assumed by the implement hitch as the tractor is turned in either direction.

Fig. 4 is a schematic plan view of a hitch linkage of the type shown in Fig. 1 illustrating the manner in which side hill or cutting width adjustment may be obtained by varying the length of one of the elements of the hitch.

Fig. 5 is a schematic plan view of a hitch linkage of the type shown in Fig. 1 illustrating the manner in which the effective point of application of side draft forces to the tractor may be shifted longitudinally of the tractor by varying the length of an element of the hitch.

Fig. 6 is a view similar to Fig. 5 illustrating the manner in which the effective point of application of side draft forces to the tractor may be shifted longitudinally of the tractor by variation of the length of another element of the hitch.

Fig. 7 is a schematic plan view of a hitch construction embodying this invention wherein the tractor draft links are parallel.

As shown on the drawings:

The hitch construction hereafter described is particularly adaptable for use on the well known type of tractor 10 which has a rear axle housing 11 supported by a pair of rear wheels 12. At laterally spaced points on the rear axle housing 11, a pair of trailing hitch links 13 and 13' are respectively pivoted, as at points A and A' (see particularly Figs. 2 and 3). The pivot bearings customarily employed to connect the hitch links 13 and 13' to the tractor housing 11 are of the spherical type, permitting hitch links 13 and 13' to move both horizontally and vertically relative to the tractor. The hitch links 13 and 13' may be concurrently raised or lowered by a power lifting mechanism incorporated in the tractor which comprises a pair of rocker arms 14 which are respectively connected to the hitch links 13 and 13' by connecting links 15 and 15b. The connecting link 15 is conventionally formed of an adjustable length construction and incorporates a crank 15a by which the effective length of link 15 may be conveniently manually adjusted. It has been common practice to provide on such tractors an additional pair of pivot mounting points designated schematically at B and B' and located respectively laterally outward of the hitch link pivot points A and A', which additional pivot mountings are ordinarily employed to universally pivotally mount stabilizer links one of which is shown as element 16. Since the function of the link 16 in the hitch construction of this invention is entirely different from that of the normal stabilizing links, it will be hereinafter referred to as a supplementary draft link. It should, however, be noted that the axis of pivotal mounting of the supplementary draft link 16 is in alignment with the axis of pivotal mounting of the main draft links 13 and 13' on the tractor and that a spherical type pivot bearing is employed to effect the mounting of the supplementary draft links 16 to the tractor.

The construction thus far described is entirely conventional and well known and further description thereof is deemed unnecessary.

The hitch construction embodying this invention is based upon certain fundamental geometric considerations. In general, the effective hitch point of any implement relative to a tractor pulling it is that point on the tractor about which the implement may be considered to pivot in all of the relative horizontal positions that the implement can assume with respect to the tractor. Obviously, when the implement pivots about the effective hitch point, it necessarily follows that any fixed point on the implement will also describe an arc about the effective hitch point as the center. Conversely, it follows that if any two spaced points on the implement move in arcs about a certain point on the tractor, that point on the tractor will be the effective hitch point of the implement.

The construction of a hitch embodying this invention is fundamentally based upon connecting a suitable linkage between the tractor and the implement so that two spaced points on the implement describe arcs about a selected theoretical hitch point. The determination of the necessary dimensions and locations of the hitch elements is readily accomplished when the hitch is developed for use with a tractor of the type described above having a pair of transversely spaced, universally pivoted, hitch links secured to the tractor at points A and A', plus a suitable pivot mounting B spaced laterally from point A for affecting the universal pivotal mounting of a supplementary draft link 16.

Referring to the schematic diagram of Fig. 1, the main draft links 13 and 13' are represented by lines so numbered and their points of pivotal connection to the tractor indicated respectively by the letters A and A'. While generally it is desirable that the effective hitch point be located at the intersection of the longitudinal axis of the tractor and the pivotal axis of the hitch links 13 and 13', for the purposes of illustrating the general applicability of this improved hitch construction, let a point O be selected as the effective hitch point which is arbitrarily located relative to both the longitudinal axis of the tractor and the pivotal axis of the hitch links 13 and 13'. Next select any arbitrary fixed point on the implement such as the point E. A second point on the implement, point E', can then be selected by drawing a line EE' parallel to the line AA' and locating point E' on such line preferably at the same distance from the longitudinal axis of the tractor as the point E.

Now if a hitch linkage is provided which will cause both the points E and E' to move in arcs swung about the point O, it will necessarily follow that the point O will be the effective hitch point of the implement. To make the point E swing in an arc about the point O, a lever arm 17 is provided which is pivoted to the implement on a vertical axis at the point E. The length of lever 17 may be selected as any convenient value such as ED. Lines OE and DB are then drawn and extended until they intersect at the point J. The line AJ is then drawn and the intersection of the line AJ with line ED provides the point C.

If a hitch linkage is then provided wherein the main draft link 13 is constructed in length equal to the distance AC and the supplementary draft link 16 is constructed to the length BD, and if universal pivotal connections are respectively provided between the free ends of draft links 13 and 16 and the lever 17, it will be found that the point E on the implement will move horizontally relative to the tractor only in the path of an arc swung about the point O as the center.

Thus far, the spacing relationship between the points A and B, and the points EC and ED have been determined by a geometric process. If the line OE (which is the line connecting the selected effective hitch point O with the vertical pivot axis E on the implement) is extended to intersect the line AB (which is the line through the pivotal axes of the main draft link 13 and the supplementary draft link 16) a point P is determined. The application of simple trigonometry will then reveal that the following relationship exists:

$$\frac{EC}{ED} = \frac{PA}{PB}$$

Hence, this relationship may be conveniently employed to compute the spacings between the various pivot points in a hitch embodying this invention.

It is then necessary to provide a suitable linkage to insure that a second point, such as the point E' on the implement also moves in an arc about the point O as the center and the point O will necessarily be the effective hitch point of the implement. Referring to the schematic diagram of Fig. 1, a hitch linkage is shown which will perform the function of locating the effective hitch point at any selected point, such as the point O.

Two points E and E' are selected on the implement and the point E is caused to swing about the selected hitch point O by the provision of a main draft link 13 and a supplementary draft link 16 and a lever 17 all constructed exactly in the manner heretofore described. To determine the travel of the point E so as to cause it to swing in an arc about the point O, the lever 17 is formed as one arm of a bell crank lever having a second arm 18 angularly disposed with respect to the lever arm 17. A similar bell crank lever having arms 17' and 18' disposed at the same relative angle as the arms 17 and 18 is pivotally mounted on the implement at the point E'. A point C' on the lever arm 17' is then selected so that the distance C'E' equals the distance CE. The lines A'C' and OE' are then drawn to provide the intersection point H. The line JH is then drawn and extended to intersect the extension of the line E'C' at S. The length of either the lever arm 18 or 18' is then selected, for example, as the distance EF. The line FS is then drawn and the intersection of such line with the lever arm 18' determines the point F'. A link 23 is then pivotally connected between the lever arms 18 and 18' at the pivot points F and F' respectively. A draft link 13' equal in length to draft link 13 is connected between the points A' and C'.

With the hitch constructed as shown in Fig. 1 and in the manner heretofore described, both the points E and E' will swing in an arc about the point O as the center and hence the point O will function as the effective hitch point of the implement.

Referring now to Figs. 2 and 3, there is shown a physical arrangement of a hitch linkage which has been constructed in accordance with the arrangement schematically illustrated in Fig. 1, with the exception that the effective hitch point O has been selected to lie at the intersection of the longitudinal axis of the tractor and the pivotal axis of the hitch links 13, which point produces minimum interference with the steering of the tractor.

In accordance with this invention, any implement subject to side draft forces which is to be connected to the tractor is constructed with some form of rigid transverse main frame member 20 adjacent its forward extremities. A suitable pair of brackets 21 are mounted on main frame 20 in laterally spaced relationship to define the vertical axis pivot bearings E and E' which respectively mount a pair of mirror image identical bell crank levers 22 and 22'. The bell crank levers 22 are mounted on brackets 21 in reversed relationship relative to each other. The longitudinally extending arms 18 and 18' of the bell crank levers are respectively connected to the opposite ends of a rigid link 23 corresponding to the points F and F' of Fig. 1. The laterally extending arms 17 and 17' of the bell cranks are provided with pin portions 17a and 17a' which respectively mount in the spherical type bearings 13a and 13a' conventionally provided in the ends of the tractor hitch links 13 and 13', these connection points corresponding to points C and C' of Fig. 1. One of the pin portions 17a has a lateral extension 17b formed thereon which is insertable in the spherical type bearing 16a conventionally provided in the end of the supplementary draft link 16, forming connection point D. A spacer sleeve 17c is mounted between the ends of draft link 13 and supplementary draft link 16 which spaces such ends at a distance corresponding to CD of Fig. 1. Such hitch will then function with the point O on the tractor as the effective hitch point.

From the foregoing description it is apparent that the described hitch connection will not in any manner interfere with the power lift movement of the main hitch links 13. The particular implements utilizing the hitch may be operated as a lift type implement by merely providing the common third linkage connection between a top central point on the tractor rear axle housing 11 and an upstanding frame structure on the implement. Such top link has not been shown in the drawings since it is a conventional element of this type of tractor.

With the described construction, the lever arms EC and E'C', and EF and E'F' formed by the bell cranks are identical. By applying the geometric process described heretofore, the location of the effective point of application of side draft force exerted by the implement upon the tractor may be made to coincide with the point O at the center of the rear axle housing 11, and in alignment with the common pivotal axis of the draft links 13 by simply maintaining certain proportional relationships between the transverse spacings between the ends of the hitch link 13 and the supplementary draft link 16 and the pivot points O and E respectively. Such relationship may be conveniently expressed by the following equation:

$$\frac{OA}{AB}=\frac{EC}{CD}$$

where OA, AB, EC and CD represent the spacings indicated in Fig. 2. By simple algebra, the foregoing equation may also be expressed as $$\frac{OB}{AB}=\frac{ED}{CD}$$

In other words, the spacing relationship should be such that the ratio of the distance between the central, effective hitch point O and the pivot point of the supplementary draft link 16 to the distance between the pivot point of the draft link 13 and the pivot point of the supplementary draft link 16 is equal to the ratio of the distance from the pivot point of the bell crank 22 to the point of connection of the supplementary draft link 16 to such bell crank to the distance between the connection points of the draft link 13 and the supplementary draft link 16 to such bell crank.

The effect of the described hitch arrangement and the proportioning of the spacing of the various elements of such hitch is more clearly illustrated in Fig. 3, wherein the identical hitch as described in Fig. 2 is shown, but the implement is illustrated in two extreme lateral positions relative to the tractor. In Fig. 2, the implement 20 is shown in a central or neutral lateral position relative to the tractor. Under all conditions, the draft forces of the tractor may be considered to be applied to the implement entirely at some point G which can be considered to be the center of pull of the implement. When the implement swings to an extreme left hand lateral position relative to the tractor as illustrated by the solid line construction of Fig. 3, the point G or center of pull of the implement will shift laterally to the left relative to the tractor, but will follow an arc swung about the center point O on the tractor. Likewise, when the implement occupies its extreme right hand lateral position relative to the tractor, as illustrated by the dotted line structure in Fig. 3, the point G will be found to be displaced laterally relative to the tractor along an arc swung about the point O as a center. This means that the effective hitch point of the implement in all positions relative to the tractor remains at the point O and accordingly, any side draft forces exerted by the implement on the tractor can only be exerted on the tractor at the point O, which point is, of course, the most desirable point of application of side draft forces inasmuch as little, if any, interference with the steering of the tractor will result.

With the hitch construction of the type illustrated in Figs. 2 and 3 various adjustments which are often required in the operation of implements, and particularly in plowing, may be conveniently effectuated. Thus referring to Fig. 4, there is schematically illustrated the same hitch as is structurally shown in Figs. 2 and 3. If it is desired to adjust the lateral position of the implement 20 with respect to the longitudinal center line of the tractor, such adjustment being useful to vary the effective cutting width of a plow or to adjust a plow for working on a side hill, such adjustment may be conveniently accomplished by the simple expedient of varying the effective length of the cross link 23, or in other words, varying the length FF' in the schematic diagram of Fig. 4. The solid lines in Fig. 4 indicate the normal position of the implement wherein the implement center of pull G is aligned with the center line of the tractor. By increasing the distance FF', the dotted line construction is obtained and it will be noted that the position of the implement relative to the tractor is shifted laterally to the right. Conversely, decreasing the distance FF' will produce a lateral displacement of the implement to the left. In both lateral displacement positions, the longitudinal axis of the implement remains parallel to the longitudinal axis of the tractor. Such adjustment does not materially affect the location of the effective point of hitch $O_1$ on the tractor, as it remains on a longitudinal line midway between the two hitch link attaching points A and A' on the tractor.

If it is desired to maintain the point of effective application of the hitch forces to the tractor on the longitudinal center line of the tractor, but to vary the longitudinal position of such effective hitch point, such adjustment may be conveniently effected with the hitch construction of Figs. 2 and 3 by the simple expedient of varying the dimension EC, which is the distance between the pivotal mounting axis of the bell crank 22 and the point of connection of the hitch link 13 to such bell crank. This adjustment is schematically illustrated in Fig. 5 wherein the solid lines represent the disposition of the hitch elements when the distance EC is selected to produce an effective hitch point on the tractor at the point O at the intersection of the longitudinal center line of the tractor and the pivotal mounting axis of the draft links 13. Increasing the length of the bell crank arm EC and $E_1C$ shifts the effective hitch point on the tractor rearwardly to the point Y, while decreasing the length of bell crank arm EC to $E_2C$ shifts the effective hitch point on the tractor forward to the point Z. In each of the above cases, the bell crank arms on the opposite side of the implement, E'C', $E'_1C'$ and $E'_2C'$ must be selected equal respectively to EC, $E_1C$ and $E_2C$.

A similar longitudinal adjustment of the position of the effective hitch point on the tractor may be accomplished in the hitch construction of Figs. 2 and 3 by varying the distance CD, which will be recognized as the spacing between the effective points of connection of the draft link 13 and the supplementary draft link 16 to the implement. Referring to Fig. 6, the solid line construction again represents the dimensions of the hitch elements selected to locate the effective hitch point at the point $O_1$ at the intersection of the longitudinal center line of the tractor and the pivotal axis of the hitch links 13. Decreasing the distance CD to $CD_1$ will shift the effective hitch point on the tractor to the point Y. Increasing the distance CD to $CD_2$ will shift the effective hitch point of the tractor forwardly to the point Z.

In all of the modifications heretofore described, the hitch links 13 and 13' have been so connected to the implement that they are forwardly converging. With a hitch constructed in accordance with the invention, there is no necessity for such links to forwardly converge, in fact, the hitch links 13 and 13' may be parallel and the effective hitch point still be located at the intersection of the longitudinal axis of the tractor and the axis of the pivotal mounting of the hitch links on the tractor. Referring to Fig. 7, there is schematically illustrated a linkage constructed similar to that shown in Figs. 2 and 3, employing only a single supplementary draft link 16, wherein the hitch links 13 and 13' are parallel to each other and yet effective hitch point $O_1$ on the tractor is located at the intersection of the longitudinal axis of the tractor and the axis of the pivotal mounting of the hitch links.

The same geometric process as described in detail in connection with Fig. 1 can be employed to determine the essential dimensions of the hitch shown in Fig. 7.

Accordingly, it is apparent that this invention provides a most desirable hitch arrangement for connecting all types of implements to a tractor, and which will not only permit the effective point of application of draft forces to the tractor to be located at any desired point but which will also permit convenient adjustment of the lateral position of the implement with respect to the tractor, and of the effective location of the hitch point.

It will, of course, be understood that various details of construction may be varied through a wide range without departing from the principles of this invention and it is, therefore, not the purpose to limit the patent granted hereon otherwise than necessitated by the scope of the appended claims.

I claim:

1. An implement hitch for tractors having a pair of laterally spaced, universally pivoted, trailing draft links, comprising a pair of bell cranks, means for pivotally mounting said bell cranks on the implement on laterally spaced vertical axes and in reversed relationship relative to each other, a rigid link interconnecting corresponding arms of said bell cranks, means on the other arms of said bell cranks respectively adapted for connection to the tractor draft links, and a supplementary draft link, means on one end of said supplementary draft link adapted for pivotal connection to the tractor in alignment with the pivotal mountings of the draft links but laterally spaced from one of the draft links, and means for pivotally connecting the other end of said supplementary draft link to said other arm of the adjacent bell crank.

2. An implement hitch for tractors having a pair of laterally spaced, universally pivoted, power-lifted, trailing draft links, comprising a pair of identical bell cranks, means for pivotally mounting said bell cranks on the implement on laterally spaced vertical axes and in reversed relationship relative to each other, a rigid link interconnecting corresponding arms of said bell cranks, means on the other arms of said bell cranks respectively adapted for connection to the tractor draft links, and a supplementary draft link, means on one end of said supplementary draft link adapted for universal pivotal connection to the tractor in alignment with the pivotal mountings of the draft links but laterally spaced from one of the draft links, and means for pivotally connecting the other end of said supplementary draft link to said other arm of the adjacent bell crank.

3. An implement hitch for tractors having a pair of laterally spaced, universally pivoted, trailing draft links, comprising a rigid transverse frame member on the implement, a pair of identical bell cranks, means for pivotally mounting said bell cranks on the said implement frame on laterally spaced vertical axes and in reversed relationship relative to each other, a rigid link interconnecting corresponding arms of said bell cranks, means on the other arms of said bell cranks respectively adapted for connection to the tractor draft links, and a supplementary draft link, means on one end of said supplementary draft link adapted for pivotal connection to the tractor in alignment with the pivotal mountings of the draft links but laterally spaced from one of the draft links, and means for pivotally connecting the other end of said supplementary draft link to said other arm of the adjacent bell crank.

4. An implement hitch for tractors having a pair of laterally spaced, universally pivoted, power-lifted, trailing draft links, comprising a rigid transverse frame member on the implement, a pair of identical bell cranks, means for pivotally mounting said bell cranks on the said implement frame on laterally spaced vertical axes and in reversed relationship relative to each other, a rigid link interconnecting corresponding arms of said bell cranks, means on the other arms of said bell cranks respectively adapted for connection to the tractor draft links, and a supplementary draft link, means on one end of said supplementary draft link adapted for universal pivotal connection to the tractor in alignment with the pivotal mountings of the draft links but laterally spaced from one of the draft links and means for pivotally connecting the other end of said supplementary draft link to said other arm of the adjacent bell crank.

5. An implement hitch for tractors having a pair of laterally spaced, universally pivoted, power-lifted, trailing draft links, comprising a pair of identical bell cranks, means for pivotally mounting said bell cranks on the implement on laterally spaced vertical axes and in reversed relationship relative to each other, a rigid link interconnecting corresponding arms of said bell cranks, means on the other arms of said bell cranks respectively adapted for connection to the tractor draft links, and a supplementary draft link, means on one end of said supplementary draft link adapted for universal pivotal connection to the tractor in alignment with the pivotal mountings of the draft links but laterally spaced from one of the draft links, and means for pivotally connecting the other end of said supplementary draft link to said other arm of the adjacent bell crank, the lateral positions of the ends of said supplementary draft link being proportioned relative to the adjacent draft link in accordance with the following equation:

$$\frac{OA}{AB} = \frac{EC}{CD}$$

where OA=the distance from the centerline of the tractor to the pivot point of said one draft link, AB=the distance from the pivot point of said one draft link to the pivot point of said supplementary draft link, EC=the distance from the pivotal mounting axis of said one bell crank to the pivotal connection of said one draft link to said one bell crank, CD=the distance between the pivotal connections of said one draft link and said supplementary draft link with said one bell crank.

6. An implement hitch for tractors having a pair of laterally spaced, universally pivoted, trailing draft links, comprising a pair of identical bell cranks, means for pivotally mounting said bell cranks on the implement on laterally spaced vertical axes and in reversed relationship relative to each other, a rigid link interconnecting corresponding arms of said bell cranks, means on the other arms of said bell cranks respectively adapted for connection to the tractor draft links, and a supplementary draft link, means on one end of said supplementary draft link adapted for pivotal connection to the tractor in alignment with the pivotal mountings of the draft links but laterally spaced from one of the draft links, and means for pivotally connecting the other end of said supplementary draft links to said other arm of the adjacent bell crank, the lateral positions of the ends of said supplementary draft link being proportioned relative to the adjacent draft link in accordance with the following equation:

$$\frac{OA}{AB} = \frac{EC}{CD}$$

where $OA$=the distance from the centerline of the tractor to the pivot point of said one draft link, $AB$= the distance from the pivot point of said one draft link to the pivot point of said supplementary draft link, $EC$=the distance from the pivotal mounting axis of said one bell crank to the pivotal connection of said one draft link to said one bell crank, $CD$=the distance between the pivotal connections of said one draft link and said supplementary draft link with said one bell crank.

7. An implement hitch for tractors having a pair of laterally spaced, universally pivoted, trailing draft links, comprising a rigid transverse frame member on the implement, a pair of identical bell cranks, means for pivotally mounting said bell cranks on the said implement frame on laterally spaced vertical axes and in reversed relationship relative to each other, a rigid link interconnecting corresponding arms of said bell cranks, means on the other arms of said bell cranks respectively adapted for connection to the tractor draft links, and a supplementary draft link, means on one end of said supplementary draft link adapted for pivotal connection to the tractor in alignment with the pivotal mountings of the draft links but laterally spaced from one of the draft links, and means for pivotally connecting the other end of said supplementary draft link to said other arm of the adjacent bell crank, the lateral positions of the ends of said supplementary draft link being proportioned relative to the adjacent draft link in accordance with the following equation:

$$\frac{OA}{AB}=\frac{EC}{CD}$$

where, $OA$=the distance from the centerline of the tractor to the pivot point of said one draft link, $AB$=the distance from the pivot point of said one draft link to the pivot point of said supplementary draft link, $EC$=the distance from the pivotal mounting axis of said one bell crank to the pivotal connection of said one draft link to said one bell crank, $CD$=the distance between the pivotal connections of said one draft link and said supplementary draft link with said one bell crank.

8. An implement hitch for tractors having a pair of laterally spaced, universally pivoted, power-lifted, trailing draft links, comprising a rigid transverse frame member on the implement, a pair of identical bell cranks, means for pivotally mounting said bell cranks on the said implement frame on laterally spaced vertical axes and in reversed relationship relative to each other, a rigid link interconnecting corresponding arms of said bell cranks, means on the other arm of said bell cranks respectively adapted for connection to the tractor draft links, a supplementary draft link, means on one end of said supplementary draft link adapted for universal pivotal connection to the tractor in alignment with the pivotal mountings of the draft links but laterally spaced from one of the draft links, and means for pivotally connecting the other end of said supplementary draft link to said other arm of the adjacent bell crank, the lateral positions of the ends of said supplementary draft link being proportioned relative to the adjacent draft link in accordance with the following equation:

$$\frac{OA}{AB}=\frac{EC}{CD}$$

where, $OA$=the distance from the centerline of the tractor to the pivot point of said one draft link, $AB$=the distance from the pivot point of said one draft link to the pivot point of said supplementary draft link, $EC$=the distance from the pivotal mounting axis of said one bell crank to the pivotal connection of said one draft link to said one bell crank, $CD$=the distance between the pivotal connections of said one draft link and said supplementary draft link with said one bell crank.

References Cited in the file of this patent

UNITED STATES PATENTS

| | | |
|---|---|---|
| 2,653,823 | Wilson | Sept. 29, 1953 |
| 2,653,824 | Frevik | Sept. 29, 1953 |